(12) United States Patent
Huh et al.

(10) Patent No.: US 9,527,389 B2
(45) Date of Patent: Dec. 27, 2016

(54) SYSTEM AND METHOD FOR ESTIMATING ALLOWABLE REGENERATIVE BRAKING OF VEHICLE

(71) Applicants: Hyundai Motor Company, Seoul (KR); Kia Motors Corporation, Seoul (KR)

(72) Inventors: Jee Wook Huh, Gyeonggi-Do (KR); Kyoung Cheol Oh, Gyeonggi-Do (KR); Teh Hwan Cho, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/107,465

(22) Filed: Dec. 16, 2013

(65) Prior Publication Data

US 2015/0100214 A1 Apr. 9, 2015

(30) Foreign Application Priority Data

Oct. 7, 2013 (KR) ........................ 10-2013-0118919

(51) Int. Cl.
*G06F 7/70* (2006.01)
*B60L 7/18* (2006.01)
(Continued)

(52) U.S. Cl.
CPC . *B60L 7/18* (2013.01); *B60K 6/00* (2013.01); *B60L 3/12* (2013.01); *B60L 7/14* (2013.01);
(Continued)

(58) Field of Classification Search
CPC ............. B60L 11/16; B60L 7/00; B60L 7/003; B60L 7/006; B60L 7/02; B60L 7/04; B60L 7/06; B60L 7/08; B60L 7/10; B60L 7/12; B60L 7/14; B60L 7/16; B60L 7/18; B60L 7/20; B60L 7/22; B60L 7/24; B60L 7/26; B60L 7/28; B60L 3/00; B60L 5/00; B60L 11/00; B60W 10/08; B60W 10/18; B60W 10/24; B60W 10/26; B60W 20/10; B60W 20/106; B60W 20/1062; B60W 30/18127; B60Y 2300/18125; Y02T 10/70; Y02T 10/7005; Y02T 10/7011; Y02T 10/7016; Y02T 10/7022; Y02T 10/7027; Y02T 10/7033; Y02T 10/7038; Y02T 10/7044; Y02T 10/705; Y02T 10/7055; Y02T 10/7077; Y02T 10/7083; Y02T 10/7258; Y02T 10/7266; Y02T 10/7275; Y02T 10/7283; Y02T 10/76; B60K 1/00; B60K 23/00; B60K 2702/00
(Continued)

(56) References Cited

U.S. PATENT DOCUMENTS 9,327,591 B2 * 5/2016 Yamamoto ............. B60K 6/445
2002/0096376 A1 * 7/2002 Iwasaki .................... B60K 1/04
180/65.245
(Continued)

FOREIGN PATENT DOCUMENTS

JP 2000-270404 9/2000
JP 2002-247709 8/2002
(Continued)

*Primary Examiner* — Muhammad Shafi
(74) *Attorney, Agent, or Firm* — Mintz Levin Cohn Ferris Glovsky and Popeo, P.C.; Peter F. Corless (57) ABSTRACT

A system and a method for estimating regenerative braking of a vehicle are provided to correct allowable regenerative braking and braking linearity by estimating allowable regenerative braking in consideration of a current status of a battery and a motor. The system for estimating allowable regenerative braking for a vehicle, includes: a motor control unit to provide a charging power limit of a motor as a first input; a battery management system to provide a charging
(Continued)

power limit of a battery as a second input; an active hydraulic brake to input allowable regenerative braking as a third input; and a hydraulic control unit to estimate final allowable regenerative braking using the charging power limit of the battery, the charging power limit of the motor, and the allowable regenerative braking as the inputs.

8 Claims, 8 Drawing Sheets (51) Int. Cl.
*B60K 6/00* (2006.01)
*B60L 3/12* (2006.01)
*B60L 7/14* (2006.01)
*B60L 7/26* (2006.01)
*B60L 11/18* (2006.01)
*B60L 15/20* (2006.01)
*B60W 10/06* (2006.01)

(52) U.S. Cl.
CPC .............. *B60L 7/26* (2013.01); *B60L 11/1861* (2013.01); *B60L 15/2009* (2013.01); *B60W 10/06* (2013.01); *B60L 2240/421* (2013.01); *B60L 2240/423* (2013.01); *B60L 2240/461* (2013.01); *B60L 2240/547* (2013.01); *B60L 2240/549* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7275* (2013.01)

(58) Field of Classification Search
USPC ............. 701/70, 22, 35, 208, 211, 213, 300; 180/65.21, 65.1–65.8; 340/995.1, 995.19
See application file for complete search history.

(56) References Cited

U.S. PATENT DOCUMENTS

| 2006/0163942 A1* | 7/2006 | Tsunehara | B60L 7/26 303/155 |
| 2013/0049945 A1* | 2/2013 | Crombez | B60T 1/10 340/453 |

FOREIGN PATENT DOCUMENTS

| KR | 10-2004-0017670 A | 2/2004 |
| KR | 10-2005-0118926 A | 12/2005 |
| KR | 1020060030211 | 4/2006 |
| KR | 10-2008-0036778 A | 4/2008 |
| KR | 1020090062421 | 6/2009 |
| KR | 10-2011-0054470 A | 5/2011 |
| KR | 1020120059260 | 6/2012 |

* cited by examiner

SYSTEM AND METHOD FOR ESTIMATING ALLOWABLE REGENERATIVE BRAKING OF VEHICLE

CROSS-REFERENCE TO RELATED APPLICATION

This application claims under 35 U.S.C. §119(a) the benefit of Korean Patent Application No. 10-2013-0118919 filed Oct. 7, 2013, the entire contents of which are incorporated herein by reference.

BACKGROUND (a) Technical Field

The present invention relates to a system and a method for estimating generative braking of a vehicle, and more particularly to a system and a method for estimating regenerative braking of a vehicle to obtain accurate values of allowable regenerative braking and braking linearity by estimating allowable regenerative braking while taking into consideration the current status of a battery and a motor.

(b) Description of the Related Art

Regenerative braking technology applies, for the purpose of maximizing fuel ratio of an environment-friendly vehicle, a reverse torque to an electric motor using energy generated during braking for electric energy generation and stores the generated electric energy in a high voltage battery so as to enable the stored electric energy to initiate the vehicle, which can be applied to many environment-friendly vehicles. In a hybrid vehicle, in particular, regenerative braking plays a crucial role in fuel efficiency by accounting for about 30% of improvement in fuel efficiency as compared to general vehicles.

The motor and the battery employed in regenerative braking are restricted in charging and discharging under operating conditions. In the battery, the charging of the battery may be restricted under conditions such as very high or low state of charge, high or low temperature, or another problem of the battery. In the motor, the charging function of the motor may be restricted under conditions such as very high temperature of the motor, very fast rotating speed thereof, or another problem occurring in the motor.

For example, the charging of the battery may be restricted until an engine of a vehicle is warmed up in winter, then the charging function of the motor is also restricted and the regenerative braking is affected, so that the charging/discharging of the battery may be also restricted.

Figure 1:
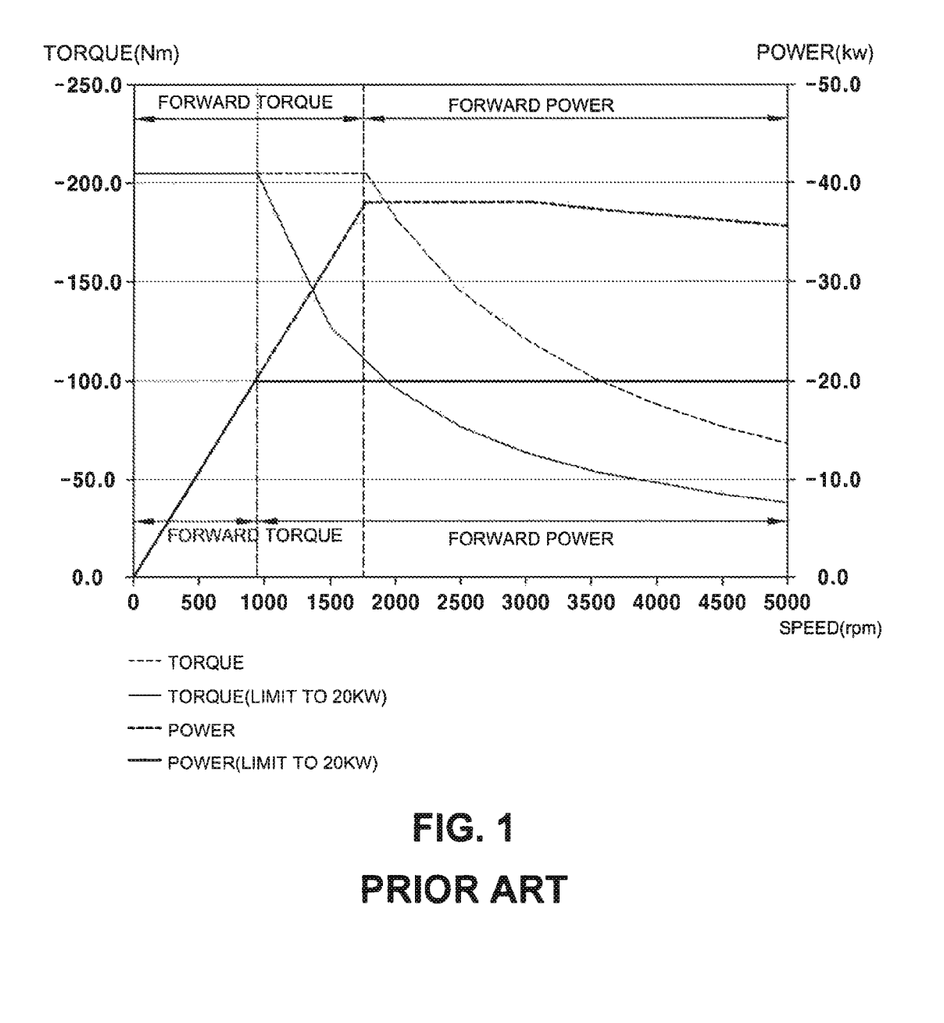
FIG. 1 (PRIOR ART) is a graph illustrating characteristic curves of a motor when a charging function of the motor is restricted and not.

FIG. 1 shows characteristic curves of a motor when the charging function of the motor is restricted and not.

Referring to FIG. 1, the motor has a forward power and a forward torque as shown by the upper curve when the charging function of the motor is not restricted, but a forward power and a forward torque as shown by the lower curve when the charging function of the motor is restricted. In particular, the overlapped portion between the forward torque area of the upper curve and the lower curve indicates an area where the torque characteristics of the motor vary according to the conditions when the charging function of the motor is restricted or not, or the current status of the motor.

Since this change of the characteristics of the motor affects the regenerative braking, in the existing regenerative braking technology, based on when the charging function of the motor is not restricted, the braking feeling varies when the charging function of the motor is restricted. Thus, it would be desirable to provide a stable braking feeling even during the restricted charging function of the motor.

Moreover, if rotational speed of the motor varies in the forward power area, torque of the motor also varies (see FIG. 1). Thus, a wheel speed (i.e., an output speed of a transmission) does not vary when the transmission is released, but the rotational speed of the motor (i.e., an input speed of the transmission) varies sharply so that the torque of the motor also varies sharply. Then, the sharp change of the torque of the motor affects the rotational speed of the motor and the transmission is further released, and as a result, a driver feels sharp change of deceleration.

Figure 2:
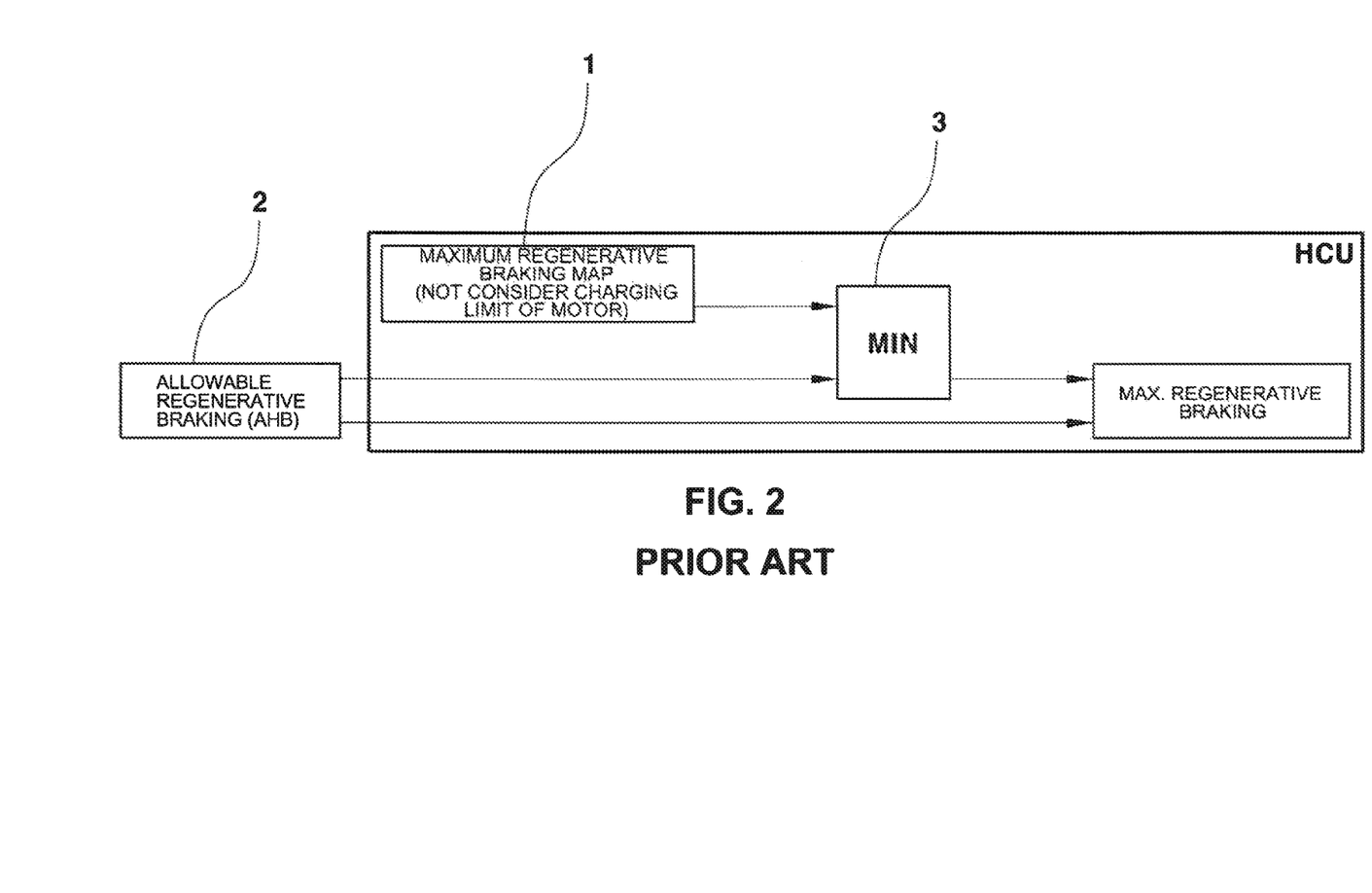
FIG. 2 (PRIOR ART) is a block diagram illustrating an existing method of estimating allowable regenerative braking.

On the other hand, in a case of the existing estimation of a maximum regenerative braking, as illustrated in FIG. 2, a maximum regenerative braking value is estimated such that a minimum value (an output value from a comparator 3) of regenerative braking values which are outputted from a maximum regenerative braking map 1 and an active hydraulic brake (AHB) 2 is selected by comparing the two output regenerative braking values and the output regenerative braking values outputted from the AHB 2 and the comparator 3 are used.

In the case where the maximum regenerative braking value is estimated as described above, according to the existing art, the maximum regenerative braking map is set simply depending on a chargeable power of a motor without any consideration of the current status of the motor such as the restriction to the charging function of the motor.

Therefore, the maximum regenerative braking map outputs a meaningless estimate when the charging function of the motor is restricted, then the maximum regenerative braking (indicated as an excessive allowable regenerative braking in FIG. 3) is estimated, so that a value greater than a regenerative braking (indicated as an executive regenerative braking in FIG. 3) actually used in vehicle braking is transmitted to the AHB.

Figure 3:
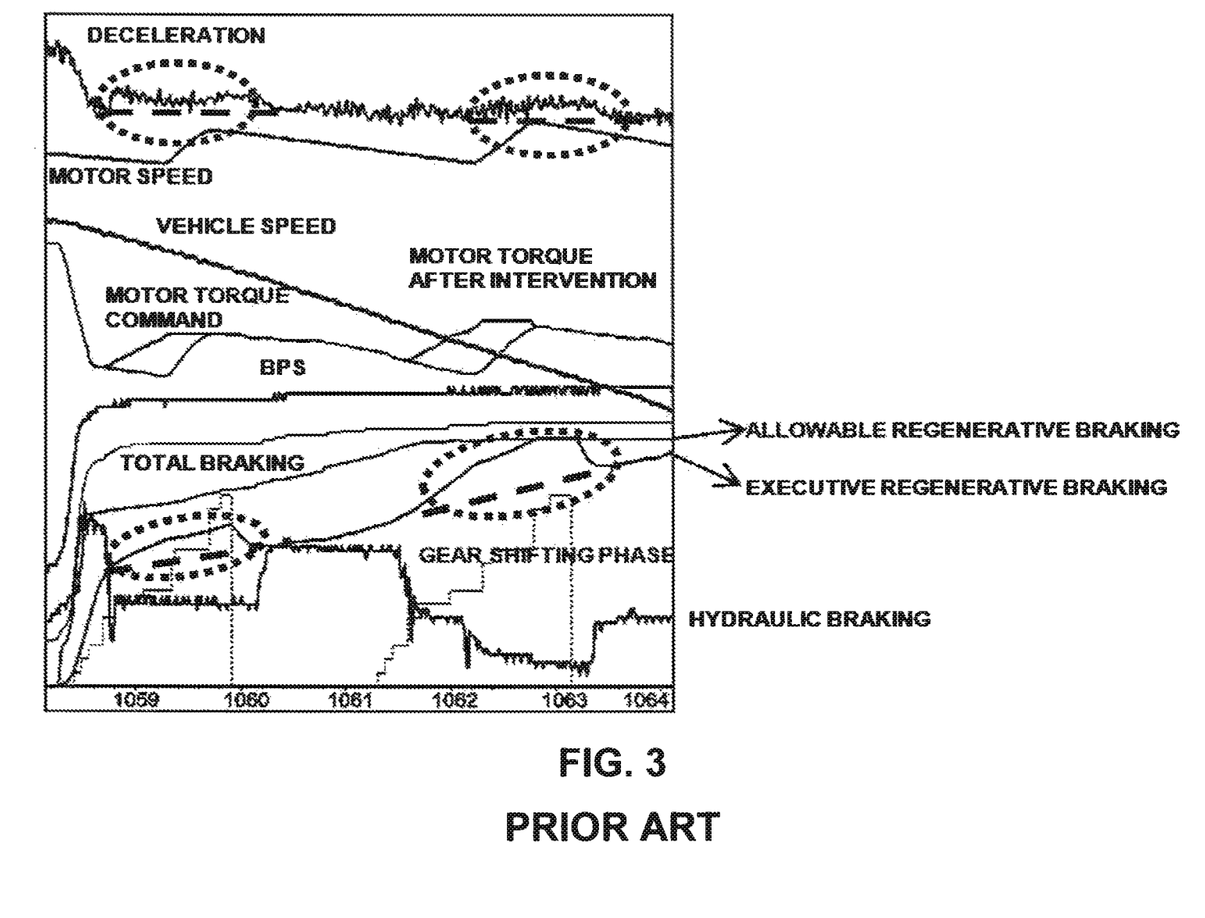
FIGS. 3 and 4 (PRIOR ART) are graphs illustrating problems in the existing estimation of the allowable regenerative braking.

The AHB estimates a braking value, which is obtained by subtracting the regenerative braking (actual regenerative braking) estimated by the hydraulic control unit (HCU) from the demand braking by a driver, as a hydraulic braking value to perform the vehicle braking. In this case, the excessive regenerative braking is estimated, and as a result of the estimation, the executive hydraulic braking is estimated so as to be smaller than the actual hydraulic braking, so that total braking (which is the sum of the executive regenerative braking and the hydraulic braking) decreases, and a vehicle may slide as a result.

Figure 4:
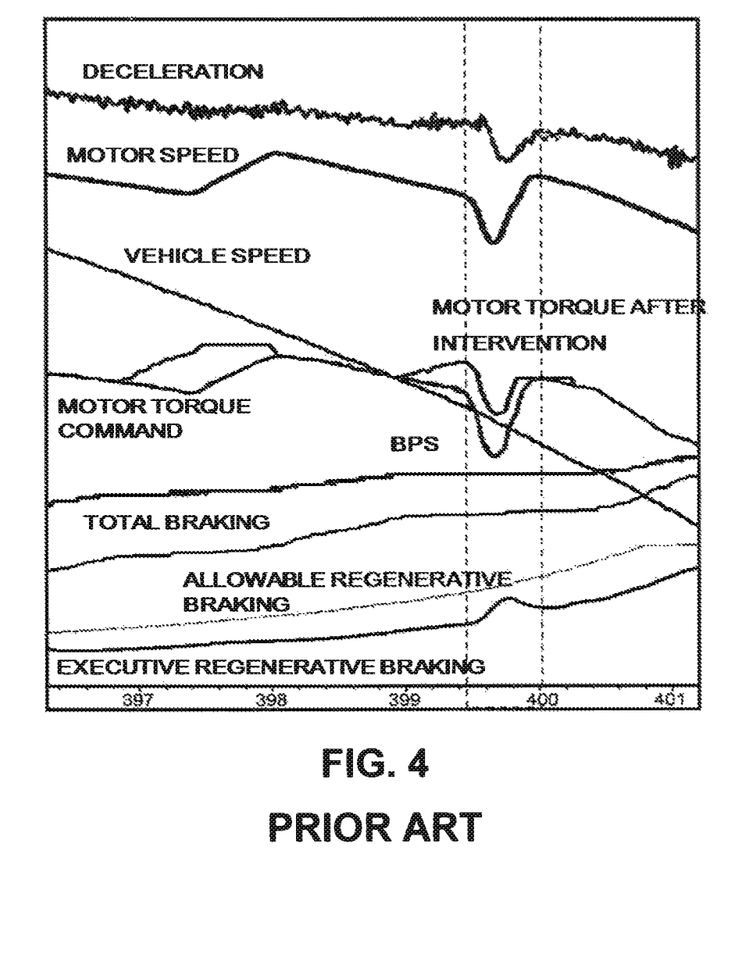

Further, in the related art, the maximum regenerative braking is estimated based on an input speed of the transmission. As illustrated in an area A indicated by yellow, a vehicle speed (output speed of the transmission) does not change when the rotational speed of a motor (the input speed of the transmission) varies due to the released transmission but a torque limit of the motor (maximum value of a motor torque) sharply varies. As a result, the actual regenerative braking value sharply varies, and the braking feeling becomes poor, thus leading to potential malfunction of the transmission (error in gear shifting) due to the sharp change of the motor torque, which may produce a negative feeling in a driver.

SUMMARY

The present invention provides a system and a method for estimating allowable regenerative braking of a vehicle to keep a stable braking feeling by estimating a final allowable regenerative braking using a charging power limit of a battery, a charging power limit of a motor, and an output speed of a transmission (a rotational speed of wheels) for the purpose of taking current statuses (characteristics) of the motor and the battery.

In accordance with an aspect of the present invention, there is provided a system for estimating allowable regenerative braking for a vehicle, including: a motor control unit (MCU) to provide a charging power limit of a motor as an input (e.g., a "first" input); a battery management system (BMS) to provide a charging power limit of a battery as an input (i.e., a "second" input); an active hydraulic brake (AHB) to input allowable regenerative braking as an input (i.e., a "third" input); and a hydraulic control unit (HCU) to estimate final allowable regenerative braking using the charging power limit of a battery, the charging power limit of a motor, and the allowable regenerative braking as the inputs.

In an embodiment of the present invention, the HCU include: a first operator to estimate the charging power limit of a motor based on the charging power limit of a battery received from the BMS; a first comparator to compare the charging power limit of a motor received from the MCU with an output from the first operator and to output an minimum value of the charging power limit of a motor and the output from the first operator; a second operator to estimate the charging torque limit of a motor based on the output from the first comparator; a second comparator to compare the charging torque limit of a motor and the allowable regenerative braking received from the AHB to output a minimum value of the charging torque limit of a motor and the allowable regenerative braking; and a third operator to estimate the final allowable regenerative braking based on an output from the second comparator.

In another embodiment of the present invention, the first operator estimates the charging power limit of a motor by dividing the charging power limit of a battery received from the BMS by a motor-inverter-battery efficiency.

In still another embodiment of the present invention, the second operator estimates the charging torque limit of a motor by dividing the charging power limit of a motor received from the first comparator by a wheel speed.

In accordance with an aspect of the present invention, there is provided a method of estimating allowable regenerative braking for a vehicle, including: (a) estimating a charging power limit of a motor based on a charging power limit of a battery from a BMS; (b) comparing the charging power limit of a motor estimated in step (a) with a charging power limit of a motor received from an MCU; (c) estimating a charging torque limit of a motor based on a smaller one of the compared results in step (b); (d) comparing the charging torque limit of a motor estimated in step (c) with an allowable regenerative braking received from an AHB; and (e) estimating a final allowable regenerative braking based on a smaller one of the compared results in step (d). In yet another embodiment of the present invention, in step (a) the charging power limit of a motor is estimated by dividing the charging power limit of a battery by a motor-inverter-battery efficiency. In yet another embodiment of the present invention, in step (c) the charging torque limit of a motor is estimated by dividing the charging power limit of a motor by a wheel speed.

In accordance with an aspect of the present invention, there is provided a method of estimating allowable regenerative braking for a vehicle based on a minimum value of a charging torque limit of a motor obtaining by dividing a charging power limit of a motor by a wheel speed and an allowable regenerative braking estimated by an AHB.

In yet another embodiment of the present invention, a minimum value of a charging power limit of a motor received from an MCU and a charging power limit of a motor estimated based on a charging power limit of a battery is used as the charging power limit of a motor.

In yet another embodiment of the present invention, the charging power limit of a motor estimated based on the charging power limit of a battery is estimated by dividing the charging power limit of a battery by a motor-inverter-battery efficiency.

In accordance with an aspect of the present invention, there is provided a system for estimating allowable regenerative braking for a vehicle, including: an MCU to provide a charging power limit of a motor as an input; an AHB to provide an allowable regenerative braking as an input; and an HCU to estimate a final allowable regenerative braking using the charging power limit of a motor and the allowable regenerative braking as input.

In yet another embodiment of the present invention, the HCU includes: a second operator to estimate the charging power limit of a motor based on the charging power limit of a motor received from the MCU; a second comparator to compare the charging power limit of a motor with the allowable regenerative braking received from the AHB and to output an minimum value of the charging power limit of a motor and the allowable regenerative braking; and a third operator to estimate a final allowable regenerative braking based on an output from the second comparator.

In accordance with an aspect of the present invention, there is provided a method of estimating allowable regenerative braking for a vehicle, including: (a) estimating a charging torque limit of a motor based on a charging power limit of a motor received from an MCU; (b) comparing the charging torque limit of a motor estimated in step (a) with an allowable regenerative braking received from an AHB; and (c) estimating a final allowable regenerative braking based on a smaller one of the compared results in step (b).

In accordance with an aspect of the present invention, there is provided a system for estimating allowable regenerative braking for a vehicle, including: a BMS to provide a charging power limit of a battery as an input; an AHB to provide an allowable regenerative braking as an input; and an HCU to estimate a final allowable regenerative braking using the charging power limit of a battery and the allowable regenerative braking as inputs.

In yet another embodiment of the present invention, the HCU includes: a first operator to estimate the charging power limit of a motor based on the charging power limit of a battery received from the BMS; a second operator to estimate a charging torque limit of a motor based on an input from the first operator; a second comparator to compare the charging torque limit of a motor received from the second operator with the allowable regenerative braking received from the AHB and to output an minimum value of the charging torque limit of a motor and the allowable regenerative braking; and a third operator to estimate a final allowable regenerative braking based on an output from the second comparator.

In accordance with an aspect of the present invention, there is provided a method of estimating allowable regenerative braking for a vehicle, including: (a) estimating a charging power limit of a motor based on a charging power limit of a battery from a BMS; (b) estimating a charging torque limit of a motor based on the charging power limit of a motor estimated in step (a); (c) comparing the charging torque limit of a motor estimated in step (b) with an allowable regenerative braking received from an AHB; and (d) estimating a final allowable regenerative braking based on a smaller one of the compared results in step (c).

Thus, the system for and the method of estimating regenerative braking for a vehicle according to the present invention has the following advantages.

First, since the allowable regenerative braking (final allowable regenerative braking) generated during the regenerative braking is precisely estimated by considering the current statues of the battery and the motor of a vehicle, erroneous estimation of the hydraulic braking value is prevented to secure a braking linearity even when the allowable regenerative braking varies by the charging power limits of the battery and/or the motor and as a result a fuel ration of the vehicle can be improved.

Second, in a case where an input shaft of a transmission is slightly released for the driver's braking feeling during the gear shifting while regenerative braking or where the transmission is released, according to the existing art, the motor torque changes sharply to generate gear shifting shock and deteriorate the driver's braking feeling because the allowable regenerative braking is estimated based on the input speed of the transmission. However, according to the present invention, the allowable regenerative braking (final allowable regenerative braking) is estimated based on the output speed of the transmission (wheel speed) so that the allowable regenerative braking does not vary even when the transmission is released and the driver's gear shifting feeling and braking feeling can be improved.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 5:
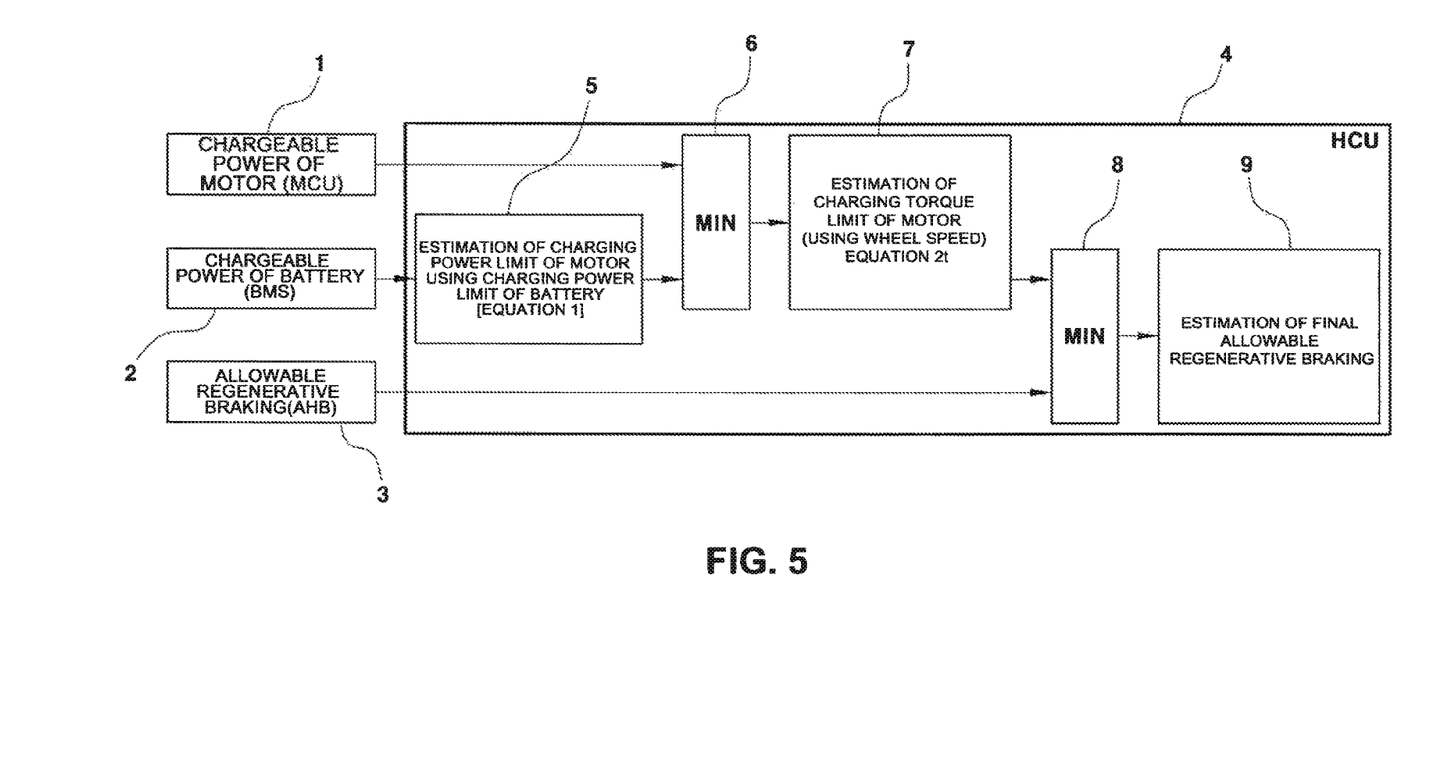
FIG. 5 is a block diagram illustrating a system and a method for estimating allowable regenerative braking of a vehicle according to an embodiment of the present invention.

As illustrated in FIG. 5, a system for estimating allowable regenerative braking according to an embodiment of the present invention includes a motor control unit (MCU) 1 providing a chargeable power (or chargeable power limit) of a motor, a battery management system (BMS) 2 providing a chargeable power (or chargeable power limit) of a battery, an active hydraulic brake (AHB) 3 providing an allowable regenerative braking, and a hydraulic control unit 4 estimating a final allowable regenerative braking using the chargeable power of the motor, the chargeable power of the battery, and the allowable regenerative braking from the AHB 3.

The MCU 1 transmits and receives a signal for the control of the motor to control overall operation of the motor, receives the chargeable power of the motor generated during the regenerative braking while gear shifting from a motor sensor, and transmits the received chargeable power of the motor to a first comparator 6 of the HCU 4.

The BMS 2 receives and transmits a signal for the management of the battery to manage overall operation of the battery and calls the chargeable power limit of the battery from a battery chargeable power limit map to acquire.

The battery chargeable power limit map has the power of the battery generated during the regenerative braking while gear shifting as an input, and outputs the chargeable power limit of the battery to which operating environment of the battery is considered and is made beforehand and provided in the BMS 2.

The BMS 2 may receive the power of the battery from a battery sensor to acquire the chargeable power limit of the battery corresponding to the received power of the battery and may transmit the same to a first comparator 5 of the HCU 4.

The AHB 3, which controls overall operations of a hydraulic brake, preferably estimates the allowable regenerative braking generated during the regenerative braking while gear shifting, and transmits the estimated allowable regenerative braking to a second comparator 8 of the HCU 4.

The allowable regenerative braking of the AHB 3 is estimated by considering useful regenerative braking of the motor from a demanded braking by a driver, and a method of estimating the allowable regenerative braking of the AHB 3 by considering useful regenerative braking of a motor is omitted because the method is already well known.

The HCU 4 includes operators to perform data operation, comparators 6 and 8 to compare data, and a storage (not shown) to store a setting value (or test value) used for the data operation by the operator 5. The HCU 4 may estimate a final allowable regenerative braking from the data inputted from the MCU 1, the BMS 2, and the AHB 3 (also referred to herein as first, second, and third inputs, respectively, although more or fewer inputs can be used, and referred to with terms such as "first input," "second input," etc.) through the operators 5, 7, and 9 and the comparators 6 and 8.

The operators may have two or more different type operators and the comparators may also have two or more different type comparators. For example, the HCU 4 may include a first operator 5 to estimate the chargeable power limit of a motor based on the chargeable power limit of a battery, a first comparator 6 to compare the chargeable power limit of a motor with the chargeable power limit of a motor from the MCU 1 and to output a minimum value of the chargeable power limits, a second operator 7 to estimate a chargeable torque limit of a motor (a chargeable torque of a motor) based on the output from the first comparator 6, a second comparator 8 to compare the output from the second comparator 7 (the chargeable torque of a motor) with the allowable regenerative braking from the AHB 3 and to output a minimum value of the chargeable torque limit of a motor and the allowable regenerative braking, and a third operator 9 to estimate a final allowable regenerative braking based on the output from the second comparator 8.

Hereinafter, a process of estimating the final allowable regenerative braking through the system for estimating allowable regenerative braking will be described. The estimation of the final allowable regenerative braking is carried out by the HCU 4, which receives corresponding data from the MCU 1, the BMS 2, and the AHB 3 respectively.

In this embodiment, for the purpose of reflecting charging restricting conditions of a battery and a motor during the regenerative braking in the estimation of the final allowable regenerative braking, in other words, for the purpose of considering charging restricting conditions of the battery and the motor during the regenerative braking, the charging power limit of a motor received from the MCU 1 and the charging power limit of a battery received from the BMS 2 are used.

In this case, the charging power limit of a battery (or chargeable power of a battery) is a maximum value of a charging power of a battery by considering a current power and an environmental condition of a chargeable battery, while the charging power limit of a motor (or chargeable power of a motor) is a maximum value of a power of a motor chargeable by the motor during the regenerative braking.

First, the first operator 5 of the HCU 4 receives the charging power limit of a battery and estimates the charging power limit of a motor according to following equation 1:

$$Pwr_{MotChgLmt2Bat} = \frac{Pwr_{BatChgLmt}}{Eff_{MotInvBat}}$$ Equation 1 where $Pwr_{MotChgLmt2Bat}$ is the charging power limit of a motor, $Pwr_{BatChgLmt}$ is the charging power limit of a battery, and $Eff_{MotInvBat}$ is motor-inverter-battery efficiency.

The motor-inverter-battery efficiency is obtained by multiplying efficiency of a motor, efficiency of an inverter, and efficiency of a battery which are obtained by experiences under same conditions.

As known from equation 1, the charging power limit of a motor may be calculated by dividing the charging power limit of a battery by the motor-inverter-battery efficiency.

In a case of charging the battery with the motor, the power charged to the battery decreases as much as the motor-inverter-battery efficiency.

For example, when the charging power limit of a battery is 90 and the motor-inverter-battery efficiency is 90%, the charging power limit of a motor is 100.

Next, the first comparator 6 of the HCU 4 receives the charging power limit of a motor from the MCU 1 and an output (result value from equation 1) from the first operator 5 and transmits a smaller one of the charging power limit of a motor and the output from the first operator 5 to the second operator 7 of the HCU 4.

The second operator 7 estimates the charging torque limit of a motor from the charging power limit of a motor received from the first comparator 6 according to following equation 2:

$$Tq_{ChgLmtWhl} = \frac{Pwr_{MotChgLmt}}{N_{Whl}}$$ Equation 2 where $Tq_{ChgLmtWhl}$ is the charging torque limit of a motor, $Pwr_{MotChgLmt}$ is the charging power limit of a motor, and $N_{Whl}$ is a wheel speed.

From equation 2, the charging torque limit of a motor may be obtained by dividing the charging power limit of a motor by the wheel speed.

The second comparator 8 of the HCU 4 compares the charging torque limit of a motor estimated by the second operator 7 and the allowable regenerative braking received from the AHB 3, and transmits a smaller one of the charging torque limit of a motor and the allowable regenerative braking to the third operator 9.

The third operator 9 estimates the final allowable regenerative braking based on the minimum value received from the second comparator 8. In this case, the third operator 9 estimates the final allowable regenerative braking based on the minimum value received from the second comparator 8 by considering a creep torque. The creep torque is a regenerative braking torque generated under the condition when a driver does not a brake pedal.

In estimating the final allowable regenerative braking as described above, due to the use of the charging torque limit of a motor and the allowable regenerative braking from the AHB, the final allowable regenerative braking is limited by the charging torque limit of a motor.

In other words, when estimating the final allowable regenerative braking, the charging torque limit of a motor is used as the maximum value of the allowable regenerative braking to limit the maximum value of the allowable regenerative braking due to the use of the minimum value of the charging torque limit and the allowable regenerative braking.

Meanwhile, when one of the charging power limit of a motor and the charging power limit of a battery is relatively very small, the smaller one may be discarded and the other (a relatively large value) may be used to estimate the final allowable regenerative braking.

In this ease, the system for estimating allowable regenerative braking according to an embodiment of the present invention may be a system in which the MCU 1 or the BMS 2 is omitted from the system.

Figure 6:
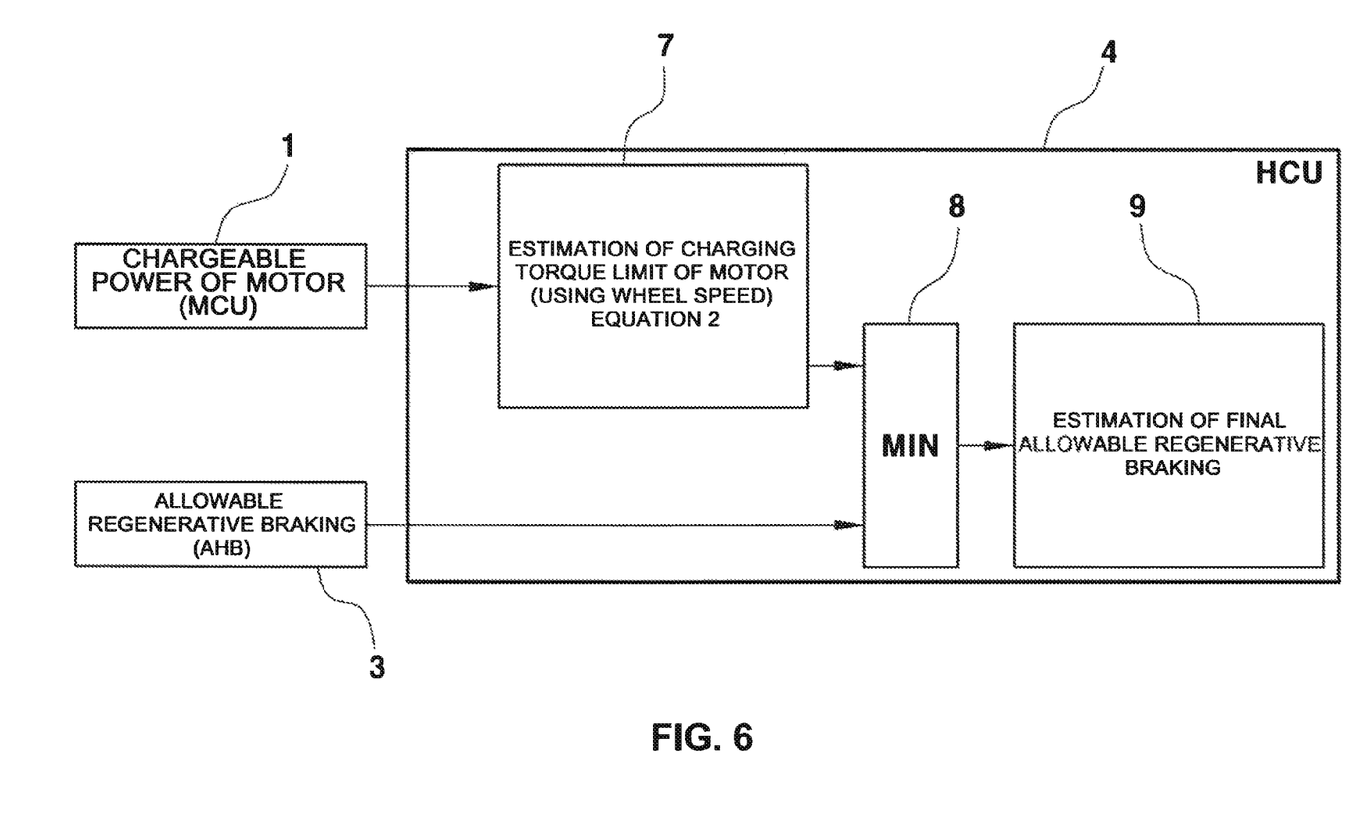
FIG. 6 is a block diagram illustrating a system and a method for estimating allowable regenerative braking according to another embodiment of the present invention.

In particular, a system for estimating allowable regenerative braking according to another embodiment of the present invention, as illustrated in FIG. 6, may include an MCU 1 providing a charging power limit of a motor (or a chargeable power of a motor), an AHB 3 providing allowable regenerative braking, and an HCU 4 estimating final allowable regenerative braking using the charging power limit and the allowable regenerative braking of a motor as inputs.

Figure 7:
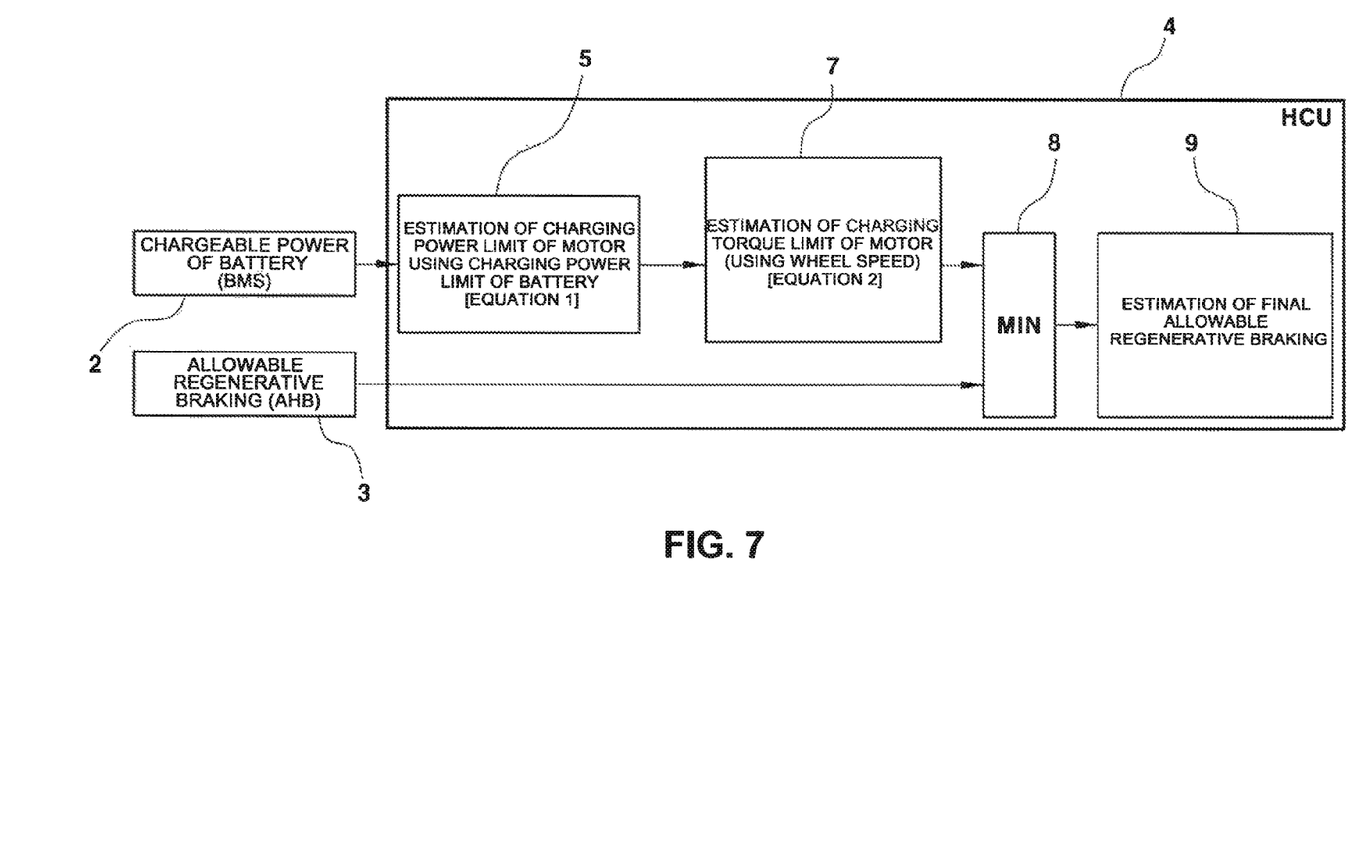
FIG. 7 is a block diagram illustrating a system and a method for estimating allowable regenerative braking according to still another embodiment of the present invention.

Further, a system for estimating allowable regenerative braking according to still another embodiment of the present invention, as illustrated in FIG. 7, may include a BMS 2 providing a charging power limit of a battery (or a chargeable power of a battery), an AHB 3 providing allowable regenerative braking, and an HCU 4 estimating final allowable regenerative braking using the charging power limit and the allowable regenerative braking of a battery as inputs.

In this case, the first comparator 6 or the first comparator 6 and the first operator 5 may be excluded from the operators and the comparators of the HCU 4.

For example, the HCU 4 as illustrated in FIG. 6 may include a second operator 7 estimating the charging torque limit of a motor (a chargeable torque of a motor) based on charging power limit of a motor received from the MCU 1, a second comparator 8 comparing an output (the charging torque limit of a motor) from the second operator 7 and the allowable regenerative braking from the AHB 3 to output a minimum value, and a third operator 9 estimating the final allowable regenerative braking based on the output from the second comparator 8.

Also, the HCU 4 as illustrated in FIG. 7 may include a first operator 5 estimating the charging power limit of a motor based on the charging power limit of a battery, a second operator 7 estimating the charging torque limit of a motor based on an output from the first operator 5, a second comparator 8 comparing the output (the charging torque limit of a motor) from the second operator 7 and the allowable regenerative braking from the AHB 3 to output a minimum value, and a third operator 9 estimating the final allowable regenerative braking based on the output from the second comparator 8.

The systems for estimating allowable regenerative braking according to the embodiments as illustrated in FIGS. 6 and 7 estimate the final allowable regenerative braking in the same process as the system according to the previous embodiment except the estimation by the first operator 5 and the comparison by the first comparator 6, and thus their descriptions will be omitted.

However, the second operator 7, in the embodiment as illustrated in FIG. 6, estimates the charging torque limit of a motor using the charging power limit of a motor received from the MCU 1, while the second operator 7, in the embodiment as illustrated in FIG. 7, estimates the charging torque limit of a motor using the charging power limit of a motor received from the first operator 5.

In the existing art, since the charging torque limit of a motor is not considered but only the allowable regenerative braking estimated by the AHB is considered to estimate the maximum regenerative braking of a motor (allowable regenerative braking), the resulting estimate of allowable regenerative braking is meaningless, i.e., such an estimate is made with poor precision and reliability when limiting the charging powers of a motor and a battery, and precision of the hydraulic braking estimated by subtracting the allowable regenerative braking from total braking becomes poor so that the braking of a vehicle becomes unstable.

Figure 8:
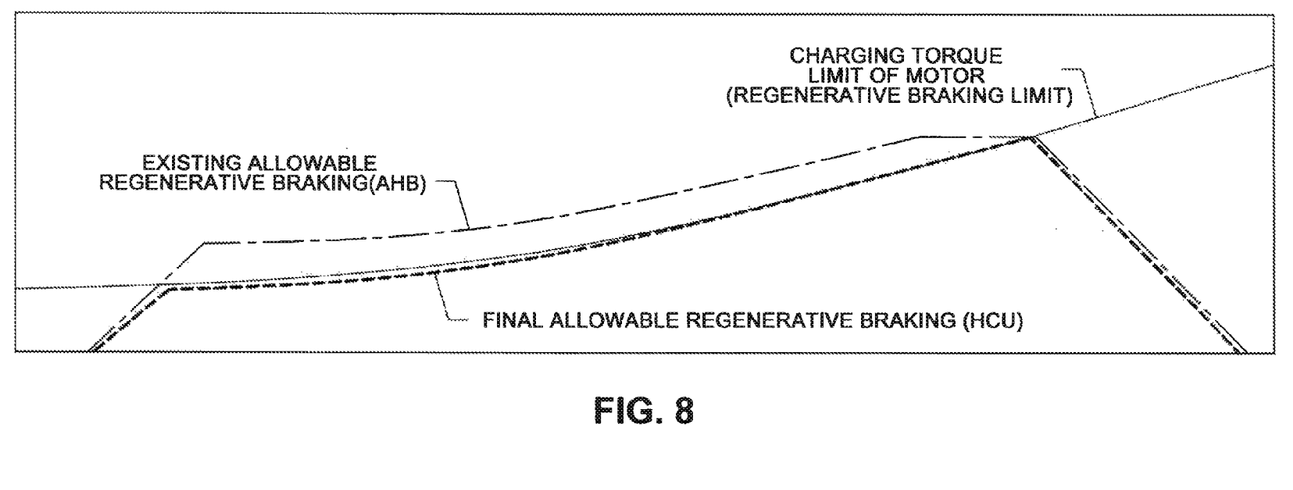
FIG. 8 is a graph illustrating the final regenerative braking estimated according to the system and the method for estimating allowable regenerative braking of a vehicle.

As illustrated in FIG. 8, according to the present invention, the allowable regenerative braking estimated by the AHB and the charging torque limit of a motor are considered to estimate the final allowable regenerative braking using the minimum value of the allowable regenerative braking and the charging torque limit of a motor as a result the maximum value of the final allowable regenerative braking is limited by the charging torque of a motor, then the final allowable regenerative braking considering the charging power limit conditions of a motor and a battery is estimated, so that preciseness of the hydraulic braking during the braking is improved and the braking stability of a vehicle is enhanced.

Especially, since the wheel speed (or an output speed of a transmission) is used based on the charging power limit of a motor when estimating the charging torque limit of a motor, the speed of an output shaft of the transmission does not change due to the release of the transmission during the regenerative braking but the sharp change of the regenerative braking which occurs when an input speed of the transmission is sharply changed, and malfunction of the transmission can be prevented.

In particular, since the charging limit conditions of a motor and a battery are considered using the charging power limit of a battery and a motor by the BMS and a wheel speed for the estimation of the charging torque limit of a motor, stable braking of a vehicle can be improved even when the transmission is released during the regenerative braking.

When the charging functions of a motor and a battery are limited, the charging power limit of a motor may be sharply changed and this characteristics change of a motor affects the regenerative braking so that the allowable regenerative braking may be also changed.

According to the present invention, since the charging torque limit of a motor estimated by dividing the charging power limit with the wheel speed is used, in other words since the charging torque limit considering the wheel speed (output speed of the transmission) is used, the regenerative braking is prevented from being sharply changed due to the sharp change of the charging power limit of a motor and the stable braking can be maintained when the charging is limited.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for estimating allowable regenerative braking of a vehicle, comprising:
   a motor control unit (MCU) to provide a charging power limit of a motor as a first input;
   a battery management system (BMS) to provide a charging power limit of a battery as a second input;

an active hydraulic brake (AHB) to input allowable regenerative braking as a third input; and a hydraulic control unit (HCU) to estimate final allowable regenerative braking using the first, second, and third inputs, wherein the HCU comprises:
- a first operator to output an estimated charging power limit of the motor by dividing the charging power limit of the battery received from the BMS by a motor-inverter-battery efficiency,
- a first comparator to compare the charging power limit of the motor received from the MCU with an output from the first operator and to output a minimum value of the charging power limit of the motor received from the MCU and the output from the first operator;
- a second operator to output an estimated charging torque limit of the motor based on the output from the first comparator;
- a second comparator to compare the estimated charging torque limit of the motor and the allowable regenerative braking received from the AHB to output a minimum value of the estimated charging torque limit of the motor and the allowable regenerative braking; and
- a third operator to estimate the final allowable regenerative braking based on an output from the second comparator.

2. The system of claim 1, wherein the second operator estimates the charging torque limit of the motor by dividing the charging power limit of the motor received from the first comparator by a wheel speed.

3. A method of estimating allowable regenerative braking for a vehicle, comprising:
(a) estimating, by a hydraulic control unit (HCU), a charging power limit of a motor based on a charging power limit of a battery from a battery management system (BMS);
(b) comparing, by the HCU, the charging power limit of the motor estimated in step (a) with a charging power limit of the motor received from a motor control unit (MCU);
(c) estimating, by the HCU, a charging torque limit of the motor based on a smaller one of the compared results in step (b);
(d) comparing, by the HCU, the charging torque limit of the motor estimated in step (c) with an allowable regenerative braking received from an active hydraulic brake (AHB);
(e) estimating, by the HCU, a final allowable regenerative braking based on a smaller one of the compared results in step (d)
(f) transmitting by the HCU the estimated final allowable regenerative braking value to an active hydraulic brake (AHB); and
(g) operating, by the AHB, a hydraulic brake based on the estimated final allowable regenerative braking value.

4. The method of claim 3, wherein in step (a) the charging power limit of the motor is estimated by dividing the charging power limit of the battery by a motor-inverter-battery efficiency.

5. The method of claim 3, wherein in step (c) the charging torque limit of the motor is estimated by dividing the charging power limit of the motor by a wheel speed.

6. A system for estimating allowable regenerative braking for a vehicle, comprising:
a motor control unit (MCU) to provide a charging power limit of a motor as a first input;

an active hydraulic brake (AHB) to provide an allowable regenerative braking as a second input; and a hydraulic control unit (HCU) to estimate a final allowable regenerative braking using the charging power limit of the motor and the allowable regenerative braking as the first and second inputs, wherein the HCU comprises:
- a first operator to output an estimated charging torque limit of the motor based on the charging power limit of the motor receiving from the MCU;
- a comparator to compare the estimated charging torque limit of the motor with the allowable regenerative braking received from the AHB and to output a minimum value of the estimated charging torque limit of the motor and the allowable regenerative braking; and
- a second operator to estimate the final allowable regenerative braking based on an output from the comparator.

7. A system for estimating allowable regenerative braking for a vehicle, comprising:
a battery management system (BMS) to provide a charging power limit of a battery as a first input;

an active hydraulic brake (AHB) to provide an allowable regenerative braking as a second input; and a hydraulic control unit (HCU) to estimate a final allowable regenerative braking using the first and second inputs, wherein the HCU includes a first operator to output an estimated charging power limit of the motor by dividing the charging power limit of the battery received from the BMS by a motor-inverter-battery efficiency, and wherein the HCU comprises:
- a second operator to estimate a charging torque limit of the motor based on an input from the first operator;
- a comparator to compare the charging torque limit of the motor received from the second operator with the allowable regenerative braking received from the AHB and to output a minimum value of the charging torque limit of the motor and the allowable regenerative braking; and
- a third operator to estimate the final allowable regenerative braking based on an output from the comparator.

8. The system of claim 7, wherein the second operator estimates the charging torque limit of the motor by dividing a charging power limit of the motor received from the first operator by a wheel speed.

* * * * *